H. L. HARTENSTEIN.
METHOD OF PRODUCING METALLIC PRODUCTS FROM IRON ORE.
APPLICATION FILED MAR. 9, 1907.
1,050,736.
Patented Jan. 14, 1913.
2 SHEETS—SHEET 1.
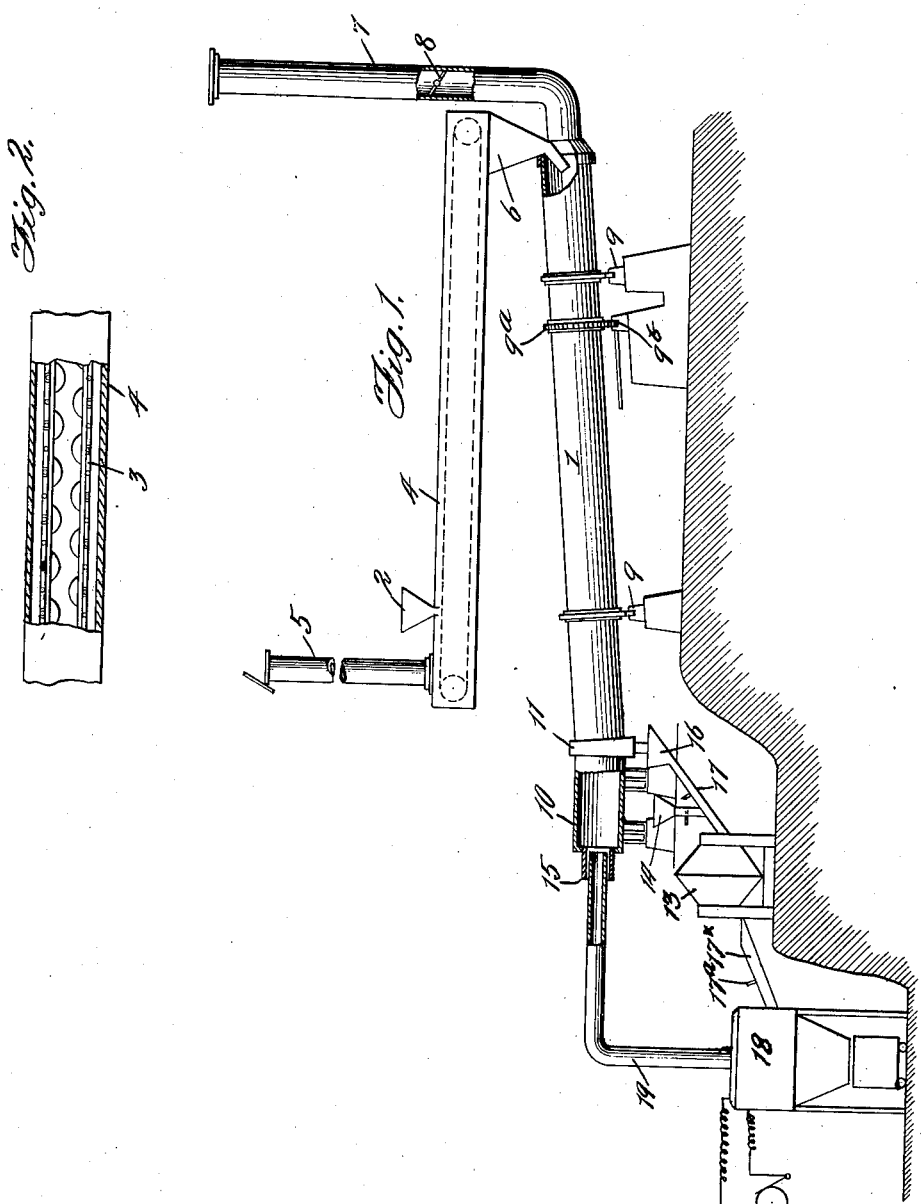

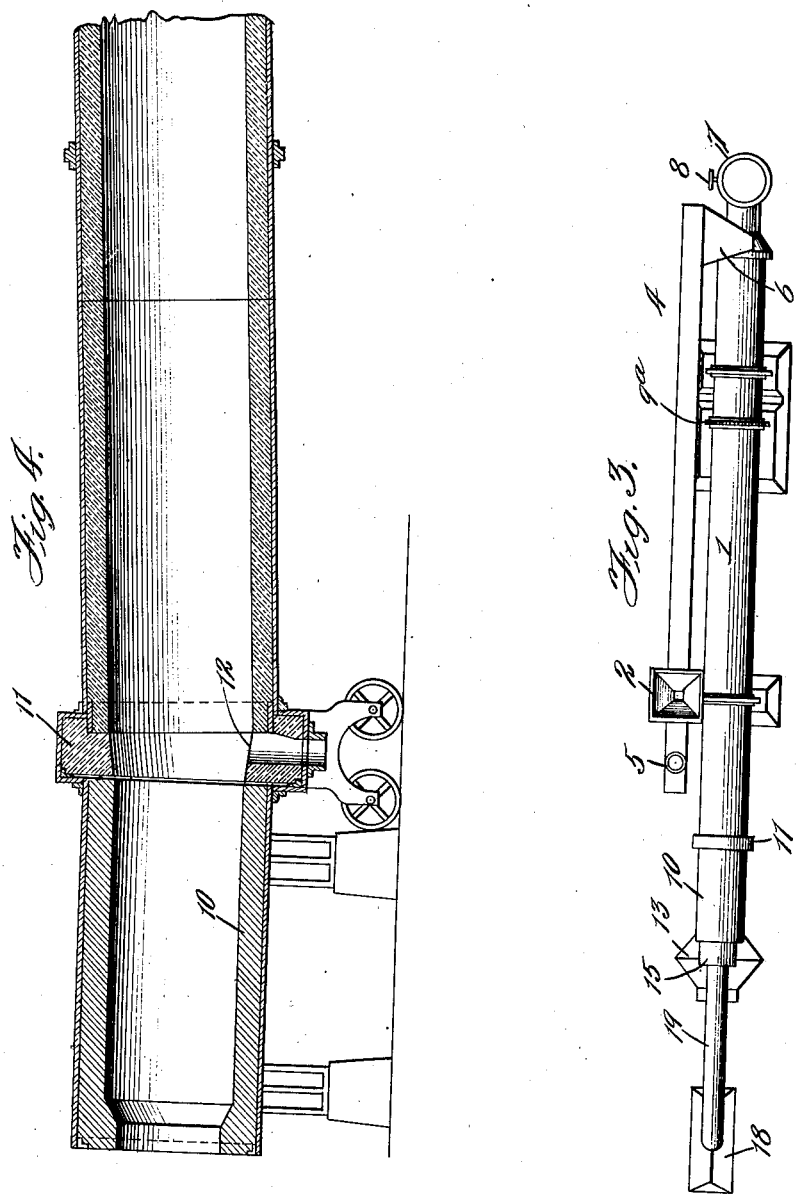

UNITED STATES PATENT OFFICE.

HERMAN L. HARTENSTEIN, OF CONSTANTINE, MICHIGAN, ASSIGNOR TO ELECTRO-CHEMICAL & DEVELOPMENT CO., OF PIERRE, SOUTH DAKOTA, A CORPORATION OF SOUTH DAKOTA.

METHOD OF PRODUCING METALLIC PRODUCTS FROM IRON ORE.

1,050,736.      Specification of Letters Patent.      Patented Jan. 14, 1913.

Application filed March 9, 1907. Serial No. 361,505.

*To all whom it may concern:*

Be it known that I, HERMAN L. HARTENSTEIN, a citizen of the United States, residing at Constantine, in the county of St. Joseph and State of Michigan, have invented certain new and useful Improvements in the Method of Producing Metallic Products from Iron Ore, of which the following is a full, clear, and exact specification.

This invention relates to the method of reducing iron ore to its metallic state or producing therefrom the various alloys constituting the different forms of steel and has more especial reference to a method of effecting the ultimate reduction of the ore by the heat of the electric furnace.

The improvements are directed mainly to economizing the fuel or heat required to that end as well as to the production of a superior grade of metal and with greater certainty as to its degree of carbon than heretofore.

It has heretofore been proposed to reduce iron ore by the heat of the electric current but as previously employed, the electric current for this purpose has been found unsuccessful owing to the excessive cost of the current necessary to have at hand in order to perform the process on a commercial basis.

It will be understood that a charge of ore and carbonaceous material, such as coke or coal, when cold requires the maximum horse power to produce a reducing degree of heat, and when the charge becomes molten only the minimum horse power because of its greater conductivity. It is also well known that in reducing iron ore to its metallic state the oxygen of the iron ore combines with the carbon of the carbonaceous material used in the process and produces carbon monoxid gas ($CO$.) which is rich in heat units. When the reduction process is performed in the blast furnace this gas is consumed and wasted when uniting with the air blast introduced into the furnace, and which air blast not only destroys the carbon monoxid but burns up that portion of the carbon, which was in excess of the amount taken up by the oxygen of the iron ore; and furthermore often re-oxidizes a portion of the reduced charge, making it uncertain as to the amount of carbon left in the charge or required to be added thereto to produce steel of a given quality or degree of carbon. This air blast also blows from the furnace the fine ore known as flue dust, which is rich in iron and which has heretofore been regarded as a waste product owing to the inability of manufacturers to keep it within the furnace while the blast is taking place. The use of this strong blast in blast furnaces also precludes the use of a large percentage of the coke which is brought to a very fine state of sub-division through shipment, handling, etc., but which is rich in carbon and adequate for the purposes of the reducing process.

In a co-pending application filed March 9, 1907, Serial Number 361,504 I have described the process of producing metallic products from iron ore wherein the iron ore and carbonaceous material are mixed together in a pre-heating furnace and carried to a partial reduction preparatory to being introduced into an electric furnace where the reduction is completed. In that process it is obvious that a portion of the carbon of the carbonaceous material used in the pre-heating furnace combines with the oxygen of the ore in that step of the process, and, as a consequence, when the charge reaches the electric furnace, the exact amount of carbonaceous material remaining is uncertain, and as a result the resultant metal requires to be analyzed in order to determine what degree of carbon it possesses.

My present invention is designed to profit by all of the advantages of the process of my aforesaid application and at the same time overcome this objection and therefore has for its primary object to avoid the necessity of having at hand the amount of electric current necessary for reducing the charge from the cold state and to be able to determine with sufficient accuracy the amount of carbon in the resultant metallic product from a determination of the amount that was introduced into the electric furnace with the iron ore.

Another object of the invention is to preserve substantially all of the carbon monoxid gas capable of being evolved by the charge of carbonaceous material and iron ore and to utilize this gas for pre-heating the charge of ore preparatory to its introduction into the electric reducing furnace, utilizing also the carbon of the gas for liberating a portion of the oxygen of the iron ore in the pre-heating furnace, whereby the amount of carbonaceous material required in the final reduction will be considerably lessened and the amount of heat necessary to effect the ultimate end desired will be considerably economized.

Incidentally my present invention also has for an object to utilize in the production of a superior grade of iron or steel the heretofore waste products known as flue dust and the finer particles of coke which have before not been appropriate for use without special and expensive treatment because of their light character and inability to remain in the blast furnaces.

In carrying out the invention the flue dust or iron ore if not already in a state of fine sub-division is crushed or otherwise reduced to that state and is then subjected to a sufficient degree of heat to enable the mass being reduced in the electric furnace after a proper proportion of carbonaceous material has been added, without requiring the heretofore objectionable heavy current necessary when the charge is introduced in the furnace in a cold state. This iron ore or flue dust being in a state of fine sub-division while undergoing this pre-heating operation must, of course, be kept in agitation, otherwise the heat would not penetrate the mass and only that on the exterior would be affected and it is also understood that the powerful air blast heretofore employed in blast furnaces could not be used for producing this agitation or in the heating of this fine material because the material would be carried off with the blast and wasted. It is therefore desirable in performing this pre-heating step of the process to employ a furnace in which the ingredients or materials are constantly agitated in the presence of a current or products of combustion so that the heat will reach all particles uniformly. It is also quite essential that the ore while undergoing this treatment be so handled or treated that it will automatically progress toward the hottest zone of the pre-heating furnace and when reaching that zone will be automatically discharged from the furnace, giving place to a further supply of the untreated material without interrupting the process or requiring special handling, the especial importance of discharging the material from the furnace at the hottest point being that the highest degree of heat which it attains in the pre-heating process may be utilized as an auxiliary in bringing the charge to a state of proper conductivity in the electric furnace so that the initial current necessary in the electric furnace for starting the reduction may be reduced to the minimum and the excessively heavy currents heretofore necessary for starting the reduction with the charge in a cold state will not be required. In order that the entire amount of carbon monoxid capable of being evolved by the carbonaceous ingredients may be evolved wholly within the electric furnace and consequently may be preserved and utilized in the pre-heating furnace and at other points in the process, the carbonaceous material is mixed with the ore after it leaves the pre-heating furnace and immediately before it is introduced into the electric furnace. As an apparatus best suited for these purposes I employ a rotary pre-heating furnace having an automatic discharge situated at the point of most perfect combustion and from which discharge the material leaving the pre-heating furnace in a granular form may be introduced directly, or substantially directly into the electric furnace without any material loss of the heat required in the pre-heating furnace. In the electric furnace the operation of final reduction is performed excluded from air and as a consequence no material amount of the carbon monoxid generated therein is consumed or wasted but may be conducted directly back to the pre-heating furnace and there admixed with sufficient air to support combustion.

With a view to the attainment of the foregoing ends, the invention consists in the features of novelty which are described herein and which will now be more specifically explained with reference to the accompanying drawings and then particularly pointed out in the claims, said drawings showing an example of a suitable apparatus for carrying the invention into effect and in which drawings—

Figure 1 is a diagrammatic side elevation of the apparatus. Fig. 2 is an enlarged central sectional view of a portion of a conveyer used therein. Fig. 3 is a diagrammatic plan view of the apparatus, and, Fig. 4 is an enlarged vertical longitudinal sectional view of a part of the pre-heating furnace.

The flue dust, fine ore or other material to be reduced may, if desired, be given a preliminary warming by the heat of waste products of combustion arising from the upper end of the pre-heating furnace, which comprises as one of its elements a rotary inclined cylinder 1. And when that is to be done the material instead of being introduced directly into the cylinder 1 is deposited in a hopper 2 arranged over an endless conveyer 3 disposed in a horizontal flue 4 having an up-take or stack 5 at one end and a discharge flue 6 at its upper end communicating with the upper end of cylinder 1; the flue 6 serving at once for the introduction of the material and the escape of the heat and products of combustion from the cylinder 1 through the flue 4, thereby also giving the material on the conveyer 3 a preliminary heating before reaching the cylinder 1. The cylinder 1 may, if desired, be also provided with a stack 7 having a damper or valve 8 so that the heat or products of combustion may be directed away from the flue 4 in greater part when desired and allowed to discharge into the atmosphere. The cylinder 1 is rotatably supported in suitable bearings 9 and provided with any suitable means, such as gear 9ª and pinion 9ᵇ, for causing its rotation at a proper rate of speed for agitating the fine ore or flue dust as the latter enters through the flue 6 and gradually works its way down the inclined cylinder, the material being continually carried up by the rotating walls of the cylinder and allowed to fall in a shower in the current of heat or products of combustion passing toward the flue 6 until the material finally reaches the discharge aperture 12 which is situated at the hottest zone or point of most perfect combustion. At the lower end of the cylinder 1 is arranged a combustion chamber or hearth 10 and between the contiguous ends of the chamber 10 and the cylinder 1 is situated a housing 11 in the bottom of which the discharge aperture 12 is formed. From the discharge opening 12 the product falls preferably directly into a receiving bin or hopper 16 having, if desired, a controlling gate 17 and from here it is allowed to discharge into a suitable mixer 13 which may be of the usual form if desired and into which mixer the proper percentage of carbonaceous material may be discharged from a second bin 14 and intimately commingled with the hot granulated ore or iron sand. If desired, any other material or ingredient to be utilized as an aid to the final reduction of the ore or to its conversion into any certain grade of steel may also be introduced in the mixer 13 so that these ingredients will be thoroughly commingled before they are eventually discharged into the electric furnace 18 through a flue or chute 17ˣ leading from the mixer and having a valve or gate 17ª for closing the connection between the electric furnace and the mixer and thereby preventing the admission of air to the electric furnace, which, as before explained, is substantially air tight. From the top of the electric furnace rises a flue 19 which communicates directly with an air inlet 15 of the combustion chamber 10 so that the carbon monoxid gas generated in the electric furnace may be passed directly while in a highly heated condition into the combustion chamber 10 and there consumed with the air admitted through the air inlet 15.

In the electric furnace the final reduction of the ore and the production of any of the various grades or characters of steel or alloys of iron is otherwise carried out according to the usual or any suitable process, that is to say, the iron sand which is produced in the pre-heating furnace and admixed with the carbonaceous material in the mixer may be utilized in the electric furnace merely for the production of iron or steel of ordinary form or in conjunction with any ores, metals or materials as the necessities of the case may require for producing the various grades of steel or alloys of iron. Heretofore in the manufacture of steel the various alloys of iron, as for example, ferro-chrome, ferro-silicon, spiegeleisen, ferro-manganese, are reheated and combined with the iron after the same has been brought to a molten condition. According to this invention, however, the various grades of steel or these iron alloys may be more directly and economically produced by mixing the natural ores or compounds from which such alloys have been heretofore produced (as, for example, silicon, manganese, chromium, tungsten aluminum, copper, nickel, cobalt, molybdenum, vanadium, platinum, titanium, rhodium, iridium, osmium or palladium) with the iron ore flue dust and carbonaceous material before the same are introduced into the electric furnace but after the iron ore has been raised to a high degree of temperature in the pre-heating furnace and has been mixed with these other ingredients while in its highly heated condition and thereby imparting to such other ingredients a portion of its heat, thereby raising the temperature of the entire charge sufficiently to avoid the necessity of employing the objectionable heavy current when starting the reduction in the electric furnace. It is also understood that when this method is followed the iron oxid in conjunction with the resultant gases has a reducing influence upon these ores and compounds which are to be alloyed with the iron for steel making.

As a suitable carbonaceous material for the purpose described, I may use coke, anthracite coal, coal slack, charcoal, peat or other suitable carbon bearing material and to each ton of ore containing about fifty-five or sixty per cent. of metallic iron, I use about three hundred and fifty pounds of the coal, coke or charcoal which, if not already in a state of fine sub-division, is reduced to that condition and this amount will produce in the electric furnace about 22,000 cubic feet of carbon monoxid at a temperature of about sixty degrees, and as this carbon monoxid gas has a thermal value of about three times that of the ordinary blast furnace gas, this would be capable of developing about eight hundred horse power and as a consequence it is seen that the electric furnace in this process would furnish all the fuel needed in the pre-heating furnace with a surplus that might be utilized elsewhere in the mill.

The carbonaceous material being introduced into the electric furnace out of contact with air and before any material portion of its carbon has been absorbed or taken up by the oxygen of the ore substantially its entire gas producing value is reserved for the electric furnace, where all of the gas capable of being evolved by the ingredients may be caught and directed to places of consumption and no appreciable portion of the carbon is lost before it reaches the electric furnace. As a consequence the final reduction of the charge may be effected with approximately twenty-five per cent. of the amount of carbon heretofore used in blast furnaces and the amount of carbon in the final product may be determined with sufficient accuracy by a determination of the percentage of carbonaceous material introduced into the electric furnace with the ore, thus enabling the manufacturer to readily reduce, by a direct and efficient method, steel of the various grades or degrees of carbon. In addition to these considerations it is seen also that it is not necessary to carry in the pre-heating furnace the very high temperature essential in a blast furnace, because in the pre-heating furnace no material amount of flux need be used although a small quantity might be employed, if desired.

Having thus described my invention, what I claim as new therein and desire to claim by Letters Patent is—

1. The process of reducing iron ore which consists in subjecting comminuted ore to a sufficient degree of heat in a reducing flame to remove a portion of the oxygen from the ore and to raise its temperature, in agitating the ore while it is being subjected to this treatment, in mixing the partially reduced ore while in a solid or non-fluid condition with comminuted carbonaceous material at a temperature below that at which any considerable amount of carbon would be consumed, and finally in subjecting the heated mixture to a reducing degree of heat.

2. The herein described process of reducing iron ore to its metallic state which consists in subjecting comminuted iron ore to a sufficient degree of heat and in the presence of elements adapted to effect a partial reduction thereof, subsequently mixing with the resultant product while still heated a suitable carbonaceous material and subsequently subjecting the mixture to the heat of an electric current excluded from air until the mass becomes molten.

3. The herein described process of reducing iron ore to its metallic state which consists in subjecting a mixture of iron ore and carbonaceous material to a reducing degree of heat excluded from air whereby molten metal and carbon monoxid gas are produced, mixing the carbon monoxid gas with sufficient oxygen to support combustion and burning the same in the presence of a separate charge of comminuted iron ore, withdrawing the comminuted iron ore from the presence of the said burning gas and then mixing therewith a suitable carbonaceous material and finally subjecting the mixture of carbonaceous material and comminuted iron ore while still heated, to a reducing degree of heat of the electric current.

4. The herein described process of reducing iron ore to its metallic state which consists in subjecting iron ore and a carbonaceous material to a reducing degree of heat excluded from air whereby molten metal and carbon monoxid gas are produced, withdrawing the carbon monoxid gas from the presence of the metal and mixing therewith sufficient oxygen to support combustion and producing from the same a lateral current of products of combustion, introducing into this lateral current of products of combustion a separate charge of comminuted iron ore and causing the ore to progress toward the point of most perfect combustion in said current until it is highly heated thereby, then withdrawing the comminuted ore thus heated from said current at said point of most perfect combustion and mixing therewith a suitable carbonaceous material and finally introducing this mixture into the path of an electric current for heating it to a reducing degree of heat.

5. The herein described process of reducing iron ore to its metallic state which consists in subjecting iron ore and carbonaceous material to a reducing degree of heat excluded from air to produce a metallic iron and carbon monoxid gas, withdrawing the carbon monoxid gas from the presence of the metal and mixing therewith sufficient oxygen to support combustion, creating a current of products of combustion from said mixture of gas and air, introducing into said current a quantity of comminuted iron ore and maintaining the same in a state of agitation, withdrawing the heated comminuted iron ore from the presence of said current and mixing therewith while still heated a suitable carbonaceous material and finally subjecting the mixture of carbonaceous material and iron ore to the heat of the electric current excluded from oxygen whereby metallic iron and carbon monoxid gas are produced and withdrawing the carbon monoxid gas and introducing it with air into the said current of products of combustion.

6. The hereindescribed process of reducing iron ore to a metallic state which consists in subjecting comminuted iron ore to the action of heat, subsequently mixing with the heated iron ore a carbonaceous material while the iron ore is still in a heated condition but at a temperature below that sufficient to consume any material amount of the carbon, introducing this mixture while in a heated condition into the presence of a reducing degree of heat excluded from atmospheric air whereby carbon monoxid will be generated and drawing off the carbon monoxid thus produced and burning the same in the presence of another charge of the said iron ore, separate from the charge in which it was produced.

7. The herein described process of reducing iron ore to its metallic state, which consists in subjecting comminuted iron ore to a sufficient degree of heat in the presence of carbon to remove a portion of the oxygen of the ore to partially reduce it and raise its temperature, subsequently mixing the heated product with a carbonaceous material while in a solid or non-fluid condition, and while heated to a temperature below that sufficient to consume any material amount of the carbon, and finally introducing the mixture into the presence of a reducing degree of heat.

8. The herein described process of reducing iron ore to its metallic state, which consists in subjecting comminuted iron ore to a sufficient degree of heat in the presence of carbon to remove a portion of the oxygen of the ore to partially reduce it and raise its temperature, subsequently mixing the heated product with a comminuted carbonaceous material while in a heated condition at a temperature below that sufficient to consume any material amount of the carbon, and finally introducing the mixture into the presence of a reducing degree of heat.

9. The herein described process of reducing iron ore to its metallic state, which consists in subjecting comminuted iron ore to a sufficient degree of heat in the presence of carbon to remove a portion of the oxygen of the ore to partially reduce it and raise its temperature, agitating the ore while being thus treated, subsequently mixing the heated product with a comminuted carbonaceous material while said product is in a comminuted condition and while still heated to a temperature below that sufficient to consume any material amount of the carbon, and finally introducing the mixture into the presence of a reducing degree of heat.

10. The process of reducing iron ore which consists in subjecting comminuted ore to a reducing flame, in cooling said ore to a temperature slightly less than that of the reducing flame, in mixing carbonaceous material with the ore while at the last mentioned temperature, and finally in immediately subjecting the mixture to a reducing heat with the exclusion of air.

11. The process of reducing iron ore which consists in electrically reducing with air excluded a preheated mixture of iron ore and carbonaceous material during which a supply of carbon monoxid is obtained, in subjecting a succeeding charge of ore to this carbon monoxid together with sufficient air to support combustion of the carbon monoxid at a reduced heat, in withdrawing the ore from the burning gas, in mixing carbonaceous material with it while still heated, and finally in electrically subjecting the mixture to a reducing degree of heat without the access of air.

In testimony whereof I have signed my name to this specification, in the presence of two subscribing witnesses, on this 5th day of March, A. D. 1907.

HERMAN L. HARTENSTEIN.

Witnesses:
    NELLIE ORTON,
    DAN. G. CASH.